No. 610,884. Patented Sept. 20, 1898.
G. L. BAKER.
HOOK.
(Application filed Mar. 27, 1897.)
(No Model.)
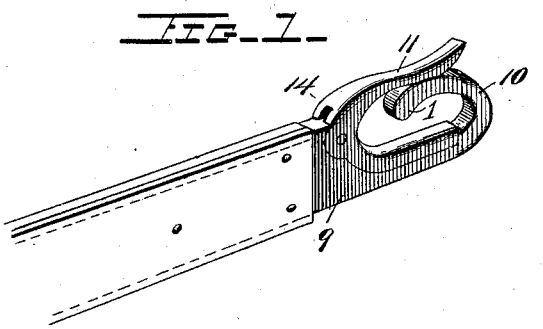
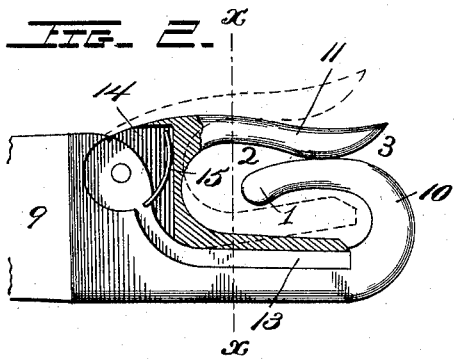
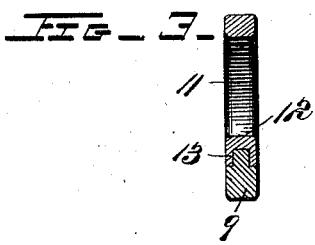
Witnesses
F. Auser
V. B. Hillyard.
Gilbert L. Baker Inventor
By his Attorneys,
C. A. Snow & Co.

UNITED STATES PATENT OFFICE.

GILBERT LINCOLN BAKER, OF WATERFORD, CALIFORNIA.

HOOK.

SPECIFICATION forming part of Letters Patent No. 610,884, dated September 20, 1898.

Application filed March 27, 1897. Serial No. 629,598. (No model.)

*To all whom it may concern:*

Be it known that I, GILBERT LINCOLN BAKER, a citizen of the United States, residing at Waterford, in the county of Stanislaus and State of California, have invented a new and useful Tug-Fastener, of which the following is a specification.

The purpose of this invention is to provide novel and effective means for connecting the hame-tug of harness with the trace-chain and the hame in such a manner as to preclude all possibility of injury to the animal or the catching of any part of the harness in open hooks, the latter or the fastenings being so constructed as to remain closed at all times except when opened by design to admit of engagement or disengagement of the tug from the hame or the trace-chain.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a hame-tug, showing the application of the invention. Fig. 2 is a side elevation of the fastening, a portion of the guard being broken away to illustrate more clearly the details of construction and arrangement. Fig. 3 is a transverse section on the line X X of Fig. 2.

Corresponding and like parts are referred to in the following description and indicated in the several views of the drawings by the same reference characters.

The fastening applied to the rear end of the tug consists of a shank 9 and a hook 10. A guard 11, of approximately C form, is pivoted at its closed end to the inner end of the hook 10, and its horizontal member 12 is channeled on its under side to receive a rib 13, formed on the inner side of the hook 10, whereby the guard and hook are held in working relation when the hook is in service. The outer member of the guard extends over the bill of the hook 10, thereby closing the said hook and preventing it engaging with the harness, animal, or other part coming in contact therewith. The inner end of the guard is recessed, as shown at 14, and forms a continuation of the aforesaid channel and receives a reduced portion formed at the inner end of the hook, the portions of the guard embracing the reduced part of the hook being curved, so as to insure a snug fit and joint between the parts, whereby a neat and effective fastening is provided. In order to prevent the guard opening accidentally by reason of the swaying of the tug or trace-chain, a spring 15 is interposed between the hook and guard and is secured at one end to the hook and has its free end exerting a pressure upon the guard to one side of its pivotal connection, whereby the desired end is attained, said spring being located within the recess 14 and protected thereby.

The extremity of the bill of the hook is curved forwardly toward the shank, as shown at 1, and the outer member of the guard overlaps the said bill and is curved to form inner and outer flaring spaces 2 and 3, respectively, which facilitate the snapping and the unsnapping of the hook when being fitted to or disengaged from a ring or link or other part of the harness. The forward thrust of the hook causes the ring or link to enter the flaring space 3 and move the outer member of the guard away from the bill of the hook, so as to facilitate the entrance of the ring into the hook, and an outward thrust or pull upon the hook after the ring or link has been brought opposite the inner flaring space 2 causes the outer member of the guard to ride upon the said ring, thereby permitting the ready uncoupling of the hook from the part of the harness with which it is engaged.

Having thus described the invention, what is claimed as new is—

In combination, a hook having the extremity of its bill curved inwardly toward the shank, and having the sides of the shank cut away or rabbeted, a guard pivoted to the outer end of the shank beyond the extremity of the bill and comprising an inner and an outer member, the latter extending over the bill and curving to form an outer and an inner flaring space with the end portions of the bill to facilitate the snapping and the unsnapping of the hook, and the inner member overlapping the shank and extending to the bight of the hook and grooved to form a matching joint with the shank, and a spring in the recessed butt-end of the guard, substantially as shown for the purpose described.

In testimony that I claim the foregoing as my own I have hereto affixed my signature in the presence of two witnesses.

GILBERT LINCOLN BAKER.

Witnesses:
JOHN H. SIGGERS,
HAROLD H. SIMMS.